(No Model.) 2 Sheets—Sheet 1.
M. M. WOOD & C. K. KING.
INSULATED TROLLEY SECTION AND CROSSOVER.
No. 535,971. Patented Mar. 19, 1895.
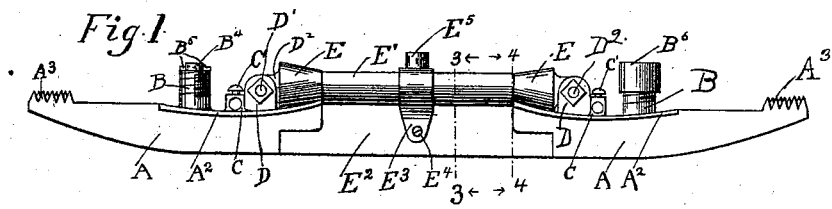
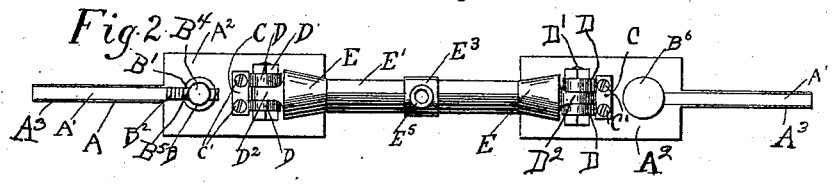
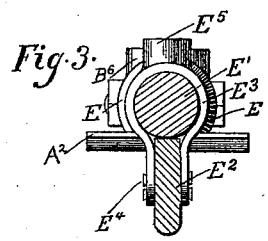
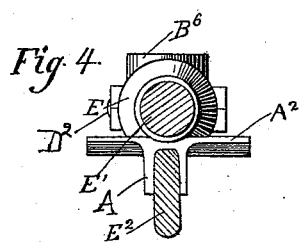
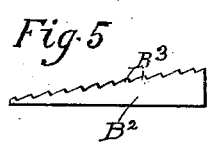
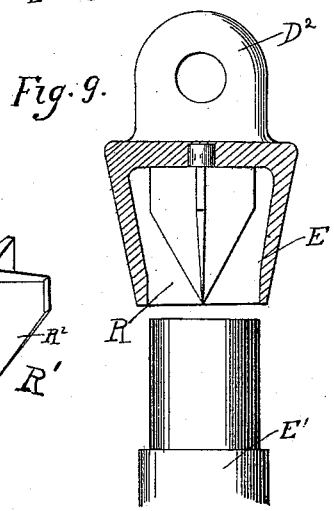
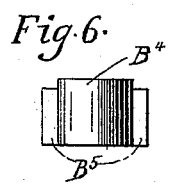
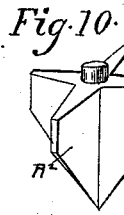
Witnesses
Jo. Schneider
D. M. Carter
Inventors
Montraville M. Wood
Charles K. King
By Francis W. Parker
Atty.

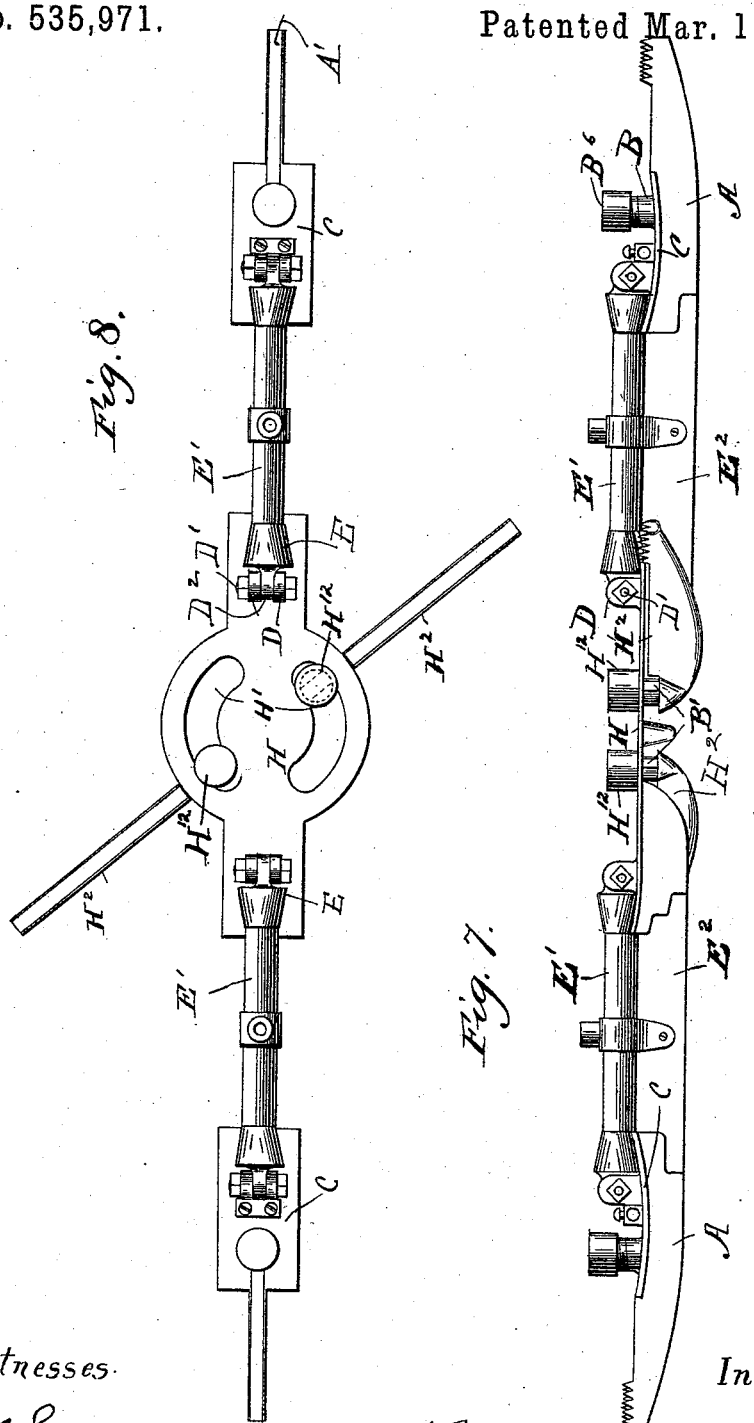

UNITED STATES PATENT OFFICE.

MONTRAVILLE M. WOOD, OF CHICAGO, ILLINOIS, AND CHARLES K. KING, OF MANSFIELD, OHIO, ASSIGNORS TO THE OHIO BRASS COMPANY, OF MANSFIELD, OHIO.

INSULATED TROLLEY SECTION AND CROSSOVER.

SPECIFICATION forming part of Letters Patent No. 535,971, dated March 19, 1895.

Application filed July 13, 1894. Serial No. 517,484. (No model.)

*To all whom it may concern:*

Be it known that we, MONTRAVILLE M. WOOD, residing at Chicago, in the county of Cook and State of Illinois, and CHARLES K. KING, residing at Mansfield, county of Richland, and State of Ohio, citizens of the United States, have invented certain new and useful Improvements in Insulated Trolley Sections and Crossovers, of which the following is a specification.

Our invention relates to suspension devices for trolley systems and has for its object to produce an improved insulating trolley section and cross-over of which the following is a description, reference being had to the accompanying drawings, wherein—

Figure 1 is a side view of an insulating section. Fig. 2 is a plan view of same. Fig. 3 is a cross-section on line 3—3 Fig. 1. Fig. 4 is a cross section on line 4—4 Fig. 1. Figs. 5 and 6 are details. Fig. 7 is a side view of the insulated adjustable cross-over. Fig. 8 is a plan view of same. Figs. 9 and 10 are details of the connection for the ends of the part E'.

Like letters refer to like parts throughout the several figures.

Figs. 1, 2, 3 and 4 are different views of our device for insulating sections of the trolley wire from each other.

A A are the tongues or metallic parts along which the trolley wheel runs and are provided with the grooves A' A' for said trolley wire and the projecting pieces $A^3$ $A^3$.

$A^2$ $A^2$ are plates integral with the tongues A. Projecting from these plates $A^2$ $A^2$ are the short, hollow tubes B. These tubes are slotted for the admission of the trolley wire at B' B' on a line with the grooves A'. At the bottom of each of the tubes B is a wedge $B^2$ with the rearwardly projecting teeth to aid in the gripping of the trolley wire. Fitting into the hollow of each tube B is the piece $B^4$ (Fig. 6) provided with the lugs $B^5$ $B^5$ which fit into the slots B' B'. The pieces $B^4$ are of such length that they project beyond the end of the tubes B (Fig. 1) when the trolley wire is in place.

$B^6$ $B^6$ are caps adapted to be screwed upon the ends of tubes B.

C C are lugs for the feeder wires which are held in place by the set screws C' C'. The lugs D D are provided with holes through which pass the bolts D', said bolts also passing through a lug $D^2$ on the conical shaped metal caps E on the end of the insulating piece E'. This insulating piece is preferably made of hard wood soaked with paraffine and coated with a preservative compound. There is a conical shaped wedge within each of said caps E which are forced into the ends of the piece E' when said piece is driven into the caps so as to spread the ends of said piece and make them completely fill the conical shaped caps. Beneath the piece E' is a flat insulating strip $E^2$, preferably of wood, which is shaped at the bottom so as to fit the groove of the trolley wheel, (Figs. 3 and 4,) the tongues A A being split at their inner ends for the reception of said strip, (Fig. 4.)

The whole device is suspended by the bifurcated piece $E^3$ the lower ends of which are sprung together and fastened to the strip $E^2$ by screws $E^4$ (Fig. 3). The stud of the hanger is screwed into the threaded projection $E^5$.

The tubes B B, lugs C and D, and plates $A^2$ are preferably integral with the tongues A.

An insulated adjustable cross-over is shown in Figs. 7 and 8, and consists of two section insulators having one end of the insulating piece E' and strip $E^2$ fastened to a tongue A, the other end of said insulating piece being fastened to the metallic plate H. Said plate is provided with slots H' preferably concentric with its center. The hollow tubes $H^{12}$ which are similar to the tubes B, are integral with the tongues $H^2$ and fit into the slots H' as shown. It will be seen that by means of these slots H' H' the tongues $H^2$ $H^2$ can be adjusted so as to allow the cross-over to be used regardless of the angle at which the two trolley wires cross each other.

In Figs. 9 and 10, the cup-shaped part E has within it the recess R and the interior loose portion or wedge R' having the tapering wings $R^2$. The part E' is driven against the sharp point of the piece $R^2$ and its end split slightly and expanded. It is evident that these several parts may be varied in form, construction and arrangement without departing from the spirit of our invention, and we therefore do not wish to be limited to the exact construction shown.

The use and operation of our invention are as follows: The device shown in Fig. 1 is for use when it is desired to divide the trolley wire into sections, and have the sections insulated from each other. To fasten the trolley wire in place the caps B⁶ B⁶ are removed and pieces B⁴ B⁴ taken out of the tubes B B. The trolley wire is then placed in the grooves A' A' and slots B' B' and the plugs or pieces B⁴ B⁴ replaced. Said pieces will now project from the ends of the tubes B as shown at the left hand end of Fig. 1. If now the caps B⁶ are screwed down the pieces or plugs B⁴ are forced against the trolley wire and the wire is firmly gripped between the plug and the wedge B². The teeth on said wedge are forced into said wire and aid in keeping the wire in place. The feeder wires are inserted in the holes in the lugs C C, and held in place by set screws C' C'. The insulating piece E' and strip E² keep the two sections of the trolley wire insulated from each other. The projections A³ A³ are bent over so as to engage the trolley wire and prevent it from being lifted out of the groove A' under the pressure of the trolley wheel. It will be seen that we have here a section insulator in which the break is positive and of sufficient length to prevent surface leakage, and which holds the trolley wire without the use of solder, said insulator being also exceedingly light, strong and durable. The insulated adjustable cross-over is used when it is desired to have two different trolley wires that cross, insulated from each other.

The two tongues H² H² are adjustable so that the cross-over can be used for wires at any angle with each other. This cross-over is practically the section insulator with the addition of the adjustable tongues H² H². The expanded end of the part E' within the cup-shaped portion E retains its hold upon the part R² while at the same time it engages the inner walls of the cup-shaped recess R. When the strain is applied the expanded end of the part E' tends to contract by its engagement with the walls of the recess and this renders its grip on the part R² more firm and thus the parts are securely held together and this is the feature we desire particularly to claim.

We claim—

1. The combination in a trolley insulating device, of tongues to which the trolley wire is to be attached, plates rigid with each of said tongues, projecting lugs on said plates, a piece of insulating material provided with caps having lugs on the end which are adapted to fit between the lugs on the plates and a bolt or the like passing through such lugs so as to hold the parts together.

2. The combination in a trolley insulating device of stationary tongues to which the ends of one trolley wire are fastened, movable tongues to which the ends of another trolley wire are fastened, said stationary and movable tongues having pieces of insulating material interposed between them in such a manner that the insulating material bears the total strain in one trolley wire.

3. A trolley section insulator comprising a piece of insulating material provided at each end with a cap having an opening or recess that increases in size as it increases in depth, a wedge within said recess adapted to enter the ends of the insulating material and expand them so as to prevent their removal, and a tongue fastened to each of said caps and adapted to be connected to the trolley wire.

4. The combination in a trolley insulating device of tongues to which the trolley wire is to be attached, plates rigid with each of said tongues, a slotted hollow tube projecting from each of said plates through which slot the trolley wire is to pass, a plug in said tube and a cap or the like by which said plug is forced against the wire, projecting lugs on said plate and a piece of insulating material having caps on each end provided with lugs adapted to fit in between the lugs on the plate and a bolt or the like passing through said lugs so as to hold the parts together.

5. A trolley section insulator comprising a piece of insulating material provided at each end with a cap having an opening or recess that increases in size as it increases in depth, a metallic portion within each recess provided with four tapering wings and adapted to enter the ends of said insulating material and expand them so as to prevent their withdrawal, a tongue fastened to each of said caps, and a mechanical clamping device connected with each tongue, substantially as described.

MONTRAVILLE M. WOOD.
CHARLES K. KING.

Witnesses:
WALTER J. GUNTHORP,
LOUIS P. BENNETT.